United States Patent
Subramanian et al.

(10) Patent No.: US 9,911,231 B2
(45) Date of Patent: Mar. 6, 2018

(54) METHOD AND COMPUTING DEVICE FOR PROVIDING AUGMENTED REALITY

(71) Applicant: Samsung Electronics Co., Ltd., Suwon-si, Gyeonggi-do (KR)

(72) Inventors: Muthukumar Subramanian, Karur (IN); Pankaj Mishra, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 432 days.

(21) Appl. No.: 14/487,543

(22) Filed: Sep. 16, 2014

(65) Prior Publication Data

US 2015/0097865 A1    Apr. 9, 2015

(30) Foreign Application Priority Data

Oct. 8, 2013    (IN) .......................... 4559/CHE/2013

(51) Int. Cl.
*G06T 19/00*    (2011.01)
*G06T 11/60*    (2006.01)

(52) U.S. Cl.
CPC ............ *G06T 19/006* (2013.01); *G06T 11/60* (2013.01); *H04N 2201/3256* (2013.01)

(58) Field of Classification Search
CPC .................. G06T 19/006; G06T 11/60; H04N 2201/3256
See application file for complete search history.

(56) References Cited

U.S. PATENT DOCUMENTS

| | | | |
|---|---|---|---|
| 2009/0158220 A1* | 6/2009 | Zalewski | G06F 3/0346 715/863 |
| 2012/0218299 A1* | 8/2012 | Hayakawa | A63F 13/655 345/633 |
| 2013/0125027 A1* | 5/2013 | Abovitz | G06F 3/011 715/757 |
| 2013/0296048 A1* | 11/2013 | Jeffery | A63F 13/12 463/31 |

\* cited by examiner

*Primary Examiner* — Jwalant Amin
(74) *Attorney, Agent, or Firm* — Jefferson IP Law, LLP (57) ABSTRACT

A method and computing device for providing Augmented Reality (AR) is provided. The method of providing AR includes detecting at least one physical object from a real scene obtained through a camera of a computing device, rendering at least one virtual object at a desired position of the detected at least one physical object on the real scene provided on a display, enabling communication through a command for interaction between the rendered at least one virtual object, and enabling the at least one virtual object to perform an action in response to command communication between the at least one virtual object.

18 Claims, 11 Drawing Sheets

MARKER-BASED AR

FIG. 2B <RELATED ART>

MARKERLESS-BASED AR

METHOD AND COMPUTING DEVICE FOR PROVIDING AUGMENTED REALITY

CROSS-REFERENCE TO RELATED APPLICATION(S)

This application claims the benefit under 35 U.S.C. § 119(a) of an Indian patent application filed on Oct. 8, 2013 in the Indian Patent Office and assigned Serial number 4559/CHE/2013, and of a Korean patent application filed on Dec. 31, 2013 in the Korean Intellectual Property Office and assigned Serial number 10-2013-0169389, the entire disclosure of each of which is hereby incorporated by reference.

TECHNICAL FIELD

The present disclosure relates to markerless augmented reality. More particularly, the present disclosure relates to a method and computing device for providing augmented reality.

BACKGROUND

Technology has progressed to achieve reality in a virtual reality system. Virtual reality is an artificial environment created by combining the real world with computer-generated data. Augmented Reality (AR) is a sort of virtual reality, and is intended to copy the artificial environment on a computer by reinforcing a virtual object in addition to a real object.

Figure 1:
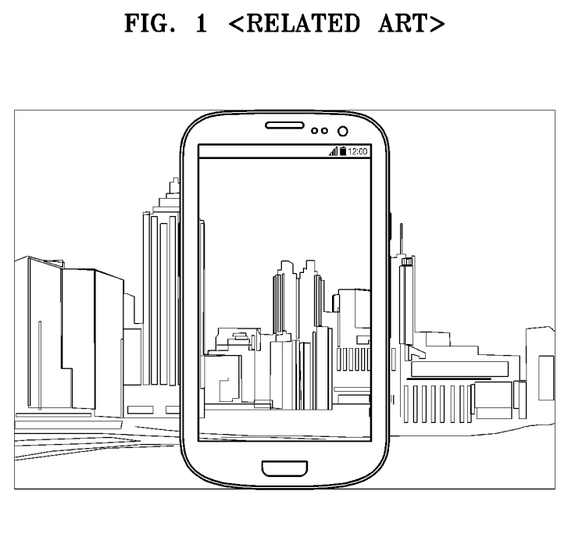
FIG. 1 illustrates Augmented Reality (AR) according to the related art.

FIG. 1 illustrates an example of AR according to the related art. A special device or camera is needed to integrate a virtual object with an actual object.

Referring to FIG. 1, if a user captures an image of a building or a sculpture on a street, for example, by using a smartphone, the image of the building or the sculpture is displayed, together with information about the building or the sculpture recognized by the smartphone, on a screen of the smartphone. An AR technology and a virtual reality technology have increasingly been used in manufacturing processes. A simulated environment is created using a real object (physical object) and a simulated object (virtual object), and the simulated environment is used to improve a design and a manufacturing process.

In AR, there are two existing models, marker-based AR and markerless-based AR.

Figure 2A:
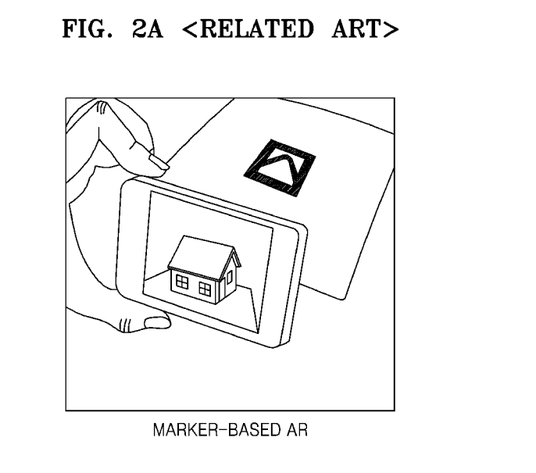
FIGS. 2A and 2B illustrate marker-based and markerless-based models of AR according to the related art.
Figure 2B:
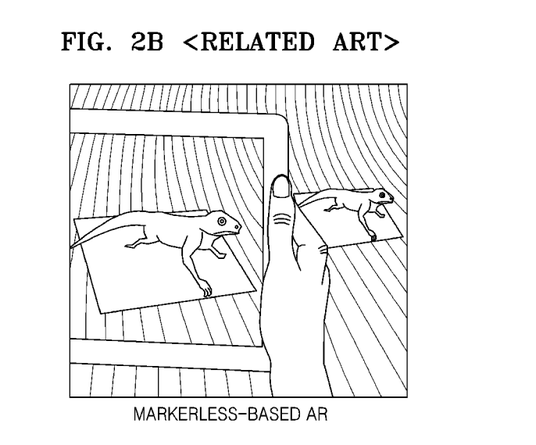

FIG. 2A illustrates an example of marker-based AR according to the related art, and FIG. 2B illustrates an example of markerless-based AR according to the related art.

Referring to FIG. 2A, marker-based AR renders a particular region in which a computer-generated image (augmented image) may be rendered, by using a marker. The marker is a symbol used to dispose a virtual object, and may be in the form of a Quick Response (QR) code or an arbitrary black/white square pattern.

Referring to FIG. 2B, the markerless-based AR (also referred to as location-based AR) removes a marker, and identifies a boundary of a particular region captured by the camera. The markerless-based AR uses a real environment as a rendering region, and in the rendering region, the computer-generated image is rendered on the environment. An advantage of the markerless-based AR is the possibility of extracting features and information to be used in a future point in time from the environment.

Typically, both AR models engage in rendering a virtual object to a user on a real environment. As technologies have grown in an embedded field, an innovative technology needed in an AR framework engages in interaction between virtual objects. However, interaction is generally limited to passive viewing.

In light of the foregoing description, a need exists for an efficient method and system for allowing rendered virtual objects to communicate with each other by using a markerless AR framework.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and computing device for providing Augmented Reality (AR), and a storage medium having recorded thereon a program for executing the method for providing AR.

Additional aspects will be set forth in part in the description which follows and, in part, will be apparent from the description, or may be learned by practice of the presented embodiments.

In accordance with an aspect of the present disclosure, a method of providing AR is provided. The method includes detecting at least one physical object from a real scene obtained through a camera of a computing device, rendering at least one virtual object at a desired position of the detected at least one physical object on the real scene provided on a display, enabling communication through a command for interaction between the rendered at least one virtual object, and enabling the at least one virtual object to perform an action in response to command communication between the at least one virtual object.

In accordance with another aspect of the present disclosure, a computing device configured to provide AR is provided. The computing device includes an object detection module configured to detect at least one physical object from a real scene obtained through a camera, a rendering module configured to render at least one virtual object at a desired position of the detected at least one physical object on the real scene provided on a display, and a command processing module configured to process commands generated by the rendered at least one virtual object, to enable communication through a command for interaction between the rendered at least one virtual object, and to enable the at least one virtual object to perform an action in response to command communication between the at least one virtual object In accordance with another aspect of the present disclosure, a computer-readable recording medium having recorded thereon a program for executing a method of providing AR is provided. The method including detecting at least one physical object from a real scene obtained through a camera of a computing device, rendering at least one virtual object at a desired position of the detected at least one physical object on the real scene provided on a display, enabling communication through a command for interaction between the rendered at least one virtual object, and enabling the at least one virtual object to perform an action in response to command communication between the at least one virtual object.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to at least one of such surface.

Various embodiments of the present disclosure described herein provide a method and system for communicating between rendered virtual objects by using a markerless-based Augmented Reality (AR) framework. An AR environment is created by capturing a live view of a physical real-world environment using a video camera and rendering a computer-generated image or digital information on the real-world environment, and a final augmented output is displayed on a display device. The markerless-based AR is a rendering region for rendering multiple computer-generated images on an actually captured scene and uses an actually captured environment.

In the present disclosure, a term indicating a relationship, such as first, second, or the like does not unnecessarily imply an actual relationship or order between entities and may be used to distinguish one entity from another entity.

A detailed description provided below is intended to provide an implementation example to those of ordinary skill in the art, but is not intended to limit the present disclosure to an explicit disclosure, and this is because those of ordinary skill in the art may understand that various changes within the scope of the described disclosure are replaceable.

Figure 3:
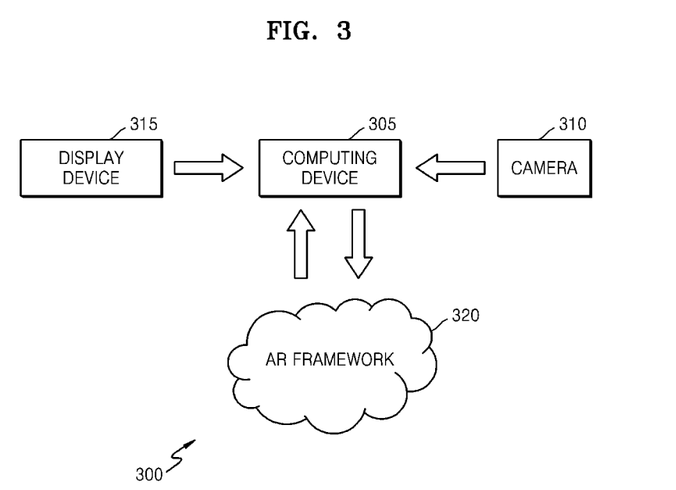
FIG. 3 is a block diagram illustrating an environment according to various embodiments of the present disclosure.

FIG. 3 is a block diagram illustrating an environment where various embodiments of the present disclosure may be implemented according to an embodiment of the present disclosure.

Referring to FIG. 3, an environment 300 may include a computing device 305, a video camera device 310, a display device 315, and an AR framework 320, but is not limited thereto. Examples of the computing device 305 may include, but not limited to, a mobile phone, a tablet device, a Personal Digital Assistant (PDA), a smartphone, a laptop and the like. The video camera device 310 is generally embedded in the computing device 305 to capture a real scene (environment) including multiple moving objects (hereinafter, referred to as physical objects). In some implementation examples, the video camera device 310 may be an external device with respect to the computing device 305. In this case, the video camera device 310 captures the real scene and provides the captured real scene to the computing device 305 as an input. In some implementation examples, a user focuses a particular region (for example, a chess board) by using the video camera device 310. In this case, only the particular region is regarded as a real scene. The display device 315 displays the real scene together with computer-generated Three-Dimensional (3D) and Two-Dimensional (2D) models. In some implementation examples, the display device 315 may be located within the computing device 305. The AR framework 320 is based on a markerless scheme in which only an environment is used to render a virtual object. The AR framework 320 may also include a mass storage.

The computing device 305 outputs the real scene captured using the video camera device 310, together with a computer-generated augmented output, by using the AR framework 320. The virtual objects disposed on the environment communicate with each other and control each other during communication.

Figure 4:
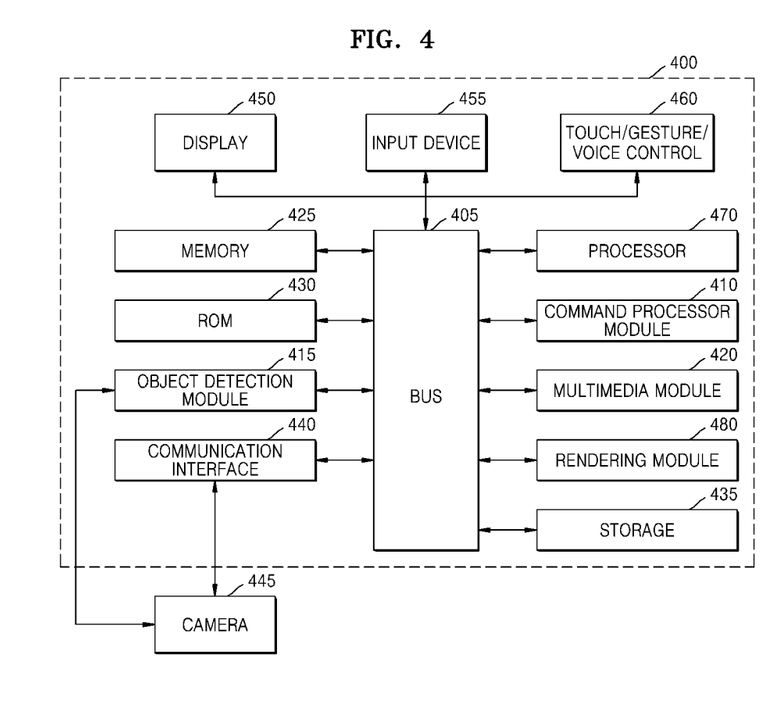
FIG. 4 is a block diagram illustrating a computing device according to an embodiment of the present disclosure.

FIG. 4 is a block diagram illustrating a computing device 400 according to an embodiment of the present disclosure.

Referring to FIG. 4, the computing device 400 may include a bus 405 for communicating information and/or other communication mechanisms. The computing device 400 may also include a memory 425 (for example, a Random Access Memory (RAM) and/or another dynamic storage device) connected to the bus 405, and the memory 425 stores information that a command processor module 410 may use. The memory 425 may be used to store any temporary information. The computing device 400 is connected to the bus 405 and may include a Read Only Memory (ROM) 430 for storing static information of the command processor module 410 and/or another static storage device. For example, a storage 435 such as a magnetic disk and/or an optical disk is provided and is connected to the bus 405 for information storage.

The computing device 400 may include the command processor module 410, an object detection module 415, a rendering module 480, and a multimedia module 420. The command processor module 410 is in charge of command processing between virtual objects. The command processor module 410 distinguishes a command used for operating a virtual object from a command used for communication between virtual objects. The command processor module 410 may include an integrated electronic circuit for processing and controlling functionality of the computing device 400. The object detection module 415 is used to detect at least one physical object in the real scene captured by a camera 445. The rendering module 480 renders at least one virtual object at a desired position of at least one physical object detected by the object detection module 415. The multimedia module 420 provides multimedia effects and sound effects to the rendered virtual objects. The multimedia is integration of media in multiple forms such as a text, graphics, audio, and video.

Various embodiments are related to the use of the computing device 400 to implement the technique described herein. In an embodiment, the command processor module 410 executes the present technique by using information included in the memory 425. Such information may be read in to the memory 425 from another machine-readable medium (for example, the storage 435). Instructions are stored in the memory 425.

The term "machine-readable medium" used herein indicates any medium participating in providing data to enable a machine to operate in a particular manner. In an embodiment implemented using the computing device 400, various machine-readable media may engage in providing information to, for example, the command processor module 410. The machine-readable medium may be a storage medium. The storage medium includes both volatile and non-volatile media. The non-volatile medium may include an optical and/or magnetic disk such as the storage 435. The volatile medium may include a dynamic memory such as the memory 425. Such medium needs to be tangible to enable a physical mechanism for reading information in a machine to detect information of the medium. However, instructions for executing a process or method of the various embodiments of this disclosure are always stored on a non-transitory computer readable medium.

A typical form of the machine-readable medium may include, for example, a floppy disk, a flexible disk, a hard disk, a magnetic tape, other magnetic media, a Compact Disk (CD)-ROM, other optical media, punch cards, paper tapes, other physical media including a pattern of holes, RAM, Programmable ROM (PROM), Erasable PROM (EPROM), flash-EPROM, other memory chips, or cartridges.

The computing device 400 may also include a communication interface 440 connected to the bus 405. The communication interface 440 provides interactive data communication and is connected to the camera 445. The camera 445 is a special device capable of capturing a real scene in an AR framework. In some various embodiments, the camera 445 is a video camera and may be embedded in the computing device 400.

The computing device 400 is connected to the display 450 through the bus 405. The display 450 may include, but not limited to, a Liquid Crystal Display (LCD), a Large Format Display (LFD), a Light Emitting Diode (LED), or a plasma display that displays a TV program, a menu, information, an advertisement, and other useful messages. An input device 455 is connected to the bus 405 to deliver an input to the command processor module 410. The input device 455 may be included in the computing device 400. A user input device of another type may be a swipe, touch such as pattern and voice recognition, gesture, or voice control 460 or a cursor direction key, and delivers an input to the command processor module 410 and controls movement of a cursor on the display 450. The input device 455 may be included in the display 450 (for example, a touch screen). The computing device 400 may also include a processor 470 for executing instructions of software of the various embodiments of the present disclosure, but is not limited thereto.

Figure 5:
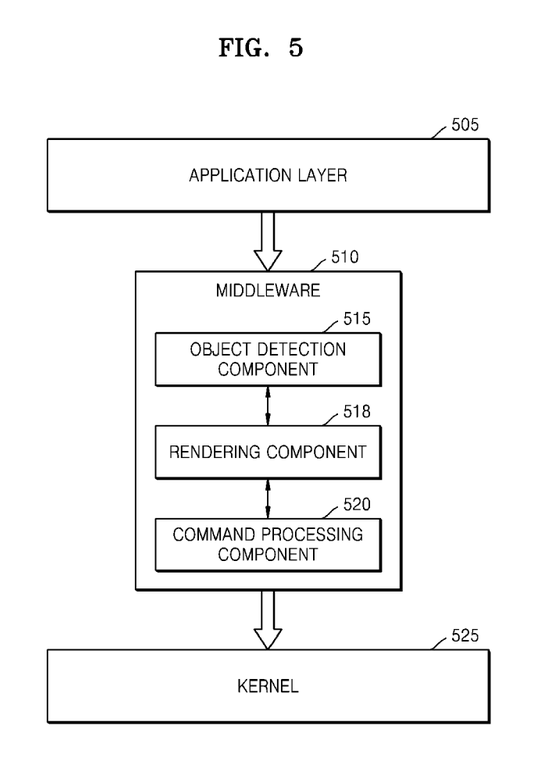
FIG. 5 is a block diagram illustrating an AR framework that supports communication between virtual objects according to an embodiment of the present disclosure.

FIG. 5 is a block diagram illustrating a markerless AR framework that supports communication between virtual objects according to an embodiment of the present disclosure.

The AR framework disposed in a computing operation system provides a bridge for establishing a communication channel between rendered 2D and 3D virtual objects to allow the virtual objects to communicate with and control each other. The AR framework provides a mechanism for executing an action between the virtual objects to give life to the virtual objects in a virtual world. This mechanism allows a markerless AR environment by working without a marker or pattern. The markerless AR framework supports an automatic communication and control mechanism between rendered moving virtual objects.

Referring to FIG. 5, the markerless AR framework may also include an application layer 505, a middleware 510, and a kernel 525.

The application layer 505 is a topmost layer in the AR framework, which supports an application and end-user process. Everything on this layer is application-specific. The middleware 510 is disposed between the application layer 505 and the kernel 525. The middleware 510 may include an object detection component 515 that detects a plurality of physical objects captured by the video camera and a command processing component 520 that processes a command generated between virtual objects. The middleware 510 may include a rendering component 518 for rendering a virtual object. The command processing component 520 intelligently acts to process and handle events based on a particular situation on a virtual object. The command processing component 520 processes a communication protocol between the rendered virtual objects and maintains a state of each virtual object during command and corresponding handshakes. The state of the physical object is also maintained. The state of each virtual object may indicate a position, for example, a "normal state", a "blasted state", or an "increased state".

The kernel 525 is a bottommost layer and an essential center of the computer operating system, and provides basic services with respect to the remaining parts of the operating system. Multiple drivers (for example, a network driver, an audio driver, and a display driver) exist in the kernel 525. These drivers are programs for notifying a method for communicating with hardware to the operating system. For example, a sound card driver notifies a method for converting data into an audio signal an audio card may output to a speaker set.

As a result, the markerless AR framework helps various applications such as a game environment and a TV.

Figure 6:
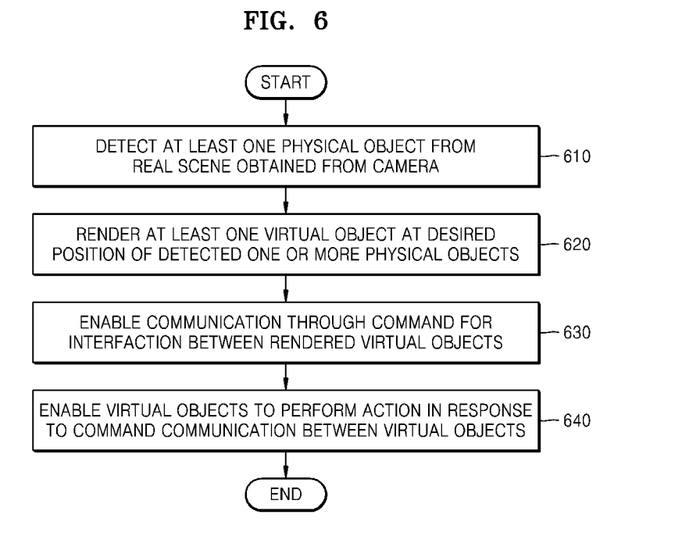
FIG. 6 is a flowchart illustrating a virtual object communication method according to an embodiment of the present disclosure.

FIG. 6 is a flowchart illustrating an operation method according to an embodiment of the present disclosure.

Referring to FIG. 6, in operation 610, the computing device obtains a real scene through the video camera device, and detects at least one physical object from the obtained real scene. The user of the computing device focuses a desired real scene (environment) for a predetermined time by using the video camera device. The real scene includes at least one physical (real) object. In some implementation examples, the user may focus a particular physical object (for example, a hand of a person). The real scene is captured by identifying a boundary corresponding to the physical object.

Then, the at least one physical object are detected from the real scene. The video camera device accurately and precisely tracks the at least one physical object. During tracking, position and orientation of the physical objects are required. As a result, the position of the video camera device with respect to the at least one physical object is calculated.

For identifying interest points, the physical object is tracked using various feature detection methods, such as corner detection and/or edge detection, and other image processing methods. Next, coordinates (also referred to as boundary) of the physical object are obtained. A value corresponding to the initial position of the physical object is calculated and is stored in a database for future requirement.

In operation 620, the computing device renders at least one virtual object at a desired position of the at least one detected physical object. That is, the at least one virtual object are rendered at a desired position of the physical objects, that is, a proper position determined in association with the physical objects. Images of both the physical object and the virtual object are disposed within the user's field of view as an output of markerless AR on the display device. For example, a virtual chessman (virtual object) may be disposed on an empty chess board (physical object) so as to be shown natural to the user. In another example, a virtual object, a gun, may be placed on a hand of a user detected from a real scene obtained by a camera.

Information about the rendered virtual object is stored in the database.

In operation 630, the computing device enables communication through a command for interaction between the rendered virtual objects. The virtual object generates a command transmitted as an input of another virtual object, such that the another virtual object may perform a particular action. The command acts like a trigger with respect to the virtual object and then is processed later. As a result, the virtual objects communicate with each other. The virtual objects interact with each other through the command. Thus, the virtual objects act together to perform the reaction.

Typically, there are two types of commands. A first type command works on a virtual object. Each application implemented in the markerless AR framework has a unique logic and each command is generated based on the logic. For example, say a virtual gun is rendered on a real scene. Commands such as "up", "down", "left", and "right" work on the virtual gun. Similarly, a second type command is used for communication between two virtual objects. For example, let's think a virtual gun and a virtual ball rendered on a real scene. The virtual gun sends a command "trigger" to the virtual ball. Thus, the trigger command is used for communication between the virtual gun and the virtual ball.

In operation 640, the computing device enables the virtual objects to perform the action in response to command communication between the virtual objects. By performing the action, the virtual objects move like in real life. Thus, the virtual objects control each other without user intervention. The action may be an action, for example, a touch, a grab, movement, and release. The action may be performed based on detection of particular events. The particular events may be expressed as values corresponding to state, surrounding environment, and relative motion of the virtual objects.

The action is defined to be unique to an application logic mentioned above in relation to operation 630. For example, suppose a virtual chess game. If a command "kill" is sent to a virtual chessman, an action "divide the virtual chessman into pieces" is performed in response to the command "kill".

A handshake is initiated to confirm performing of the action between the virtual objects. A state corresponding to a virtual object is maintained in the database. Information about the handshake is also stored in the database. Maintaining the state in the database is helpful for determining whether the action is successfully performed. For example, think the virtual ball. The virtual ball has a "normal state" indicating an initial position thereof. After an action performed on the virtual ball, a corresponding state changes to an "exploding state". This state confirms that the action has been successfully performed.

Multimedia effects are provided to the rendered virtual object. In a virtual reality environment, an action may be manipulated with respect to the virtual object. Examples of the multimedia effects may include, but not limited to, sound effects, animation, 3D animation, optical effects, mechanical effects, flying effects, and laser lighting and atmospheric effects.

Figure 7:
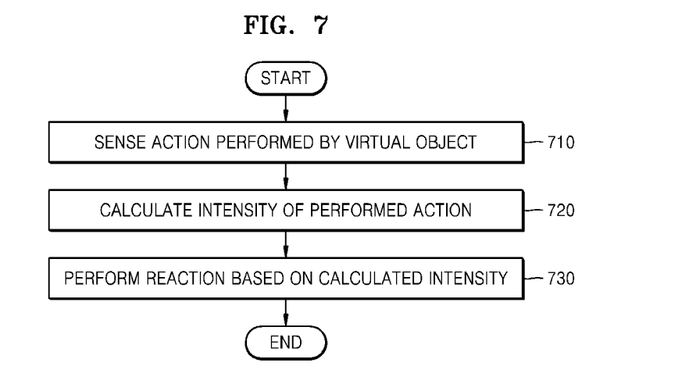
FIG. 7 is a flowchart illustrating a virtual object reaction operation method according to an embodiment of the present disclosure.

FIG. 7 is a flowchart illustrating a virtual object reaction operation method according to an embodiment of the present disclosure.

Referring to FIG. 7, in operation 710, actions are simultaneously sensed by virtual objects. An action (for example, a "move" command) performed on a virtual object is sensed at the same time by the virtual object and a virtual object that sends the command.

In operation 720, an intensity of the performed action is calculated. Every action is associated with an intensity of a performed action. For example, if a ball hits a virtual boundary, an intensity at which the ball hits the virtual boundary is calculated.

In operation 730, a reaction is performed based on the calculated intensity. This reaction determines a result based on the calculated intensity. For example, think a ball that hits a virtual boundary of an element. Herein, if the ball rolls and touches the virtual boundary, the reaction may be sending a signal "4(four)". Likewise, if the ball directly hits the virtual boundary, the reaction may be a signal "6(six)".

A use case of the operation method may be described in a chess game environment.

Suppose a chess game in which the camera captures a chess board as a real scene.

Virtual chess mans of a first player and a second player are rendered on the chess board. Two virtual hands of the first player and the second player are rendered and displayed to a user.

A command for moving a desired virtual chessman to a target position from a current position is sent to the virtual hand of the first player. For example, the command may be "Move two blocks forward".

Similarly, a command for moving a desired virtual chessman on a chess board may be sent to the virtual hand of the second player. The command and corresponding movement establish communication between virtual chessmen. As a result, the virtual chessmen communicate with and control each other, and end the chess game. Communication occurs based on the chess game logic, and the command is delivered between the virtual chessmen of the two players based on movement between the two players and an action is correspondingly performed. For example, in response to the "kill" command with respect to a virtual "king" chessman, an action "divide the virtual chessman into pieces" may be performed.

Figure 8:
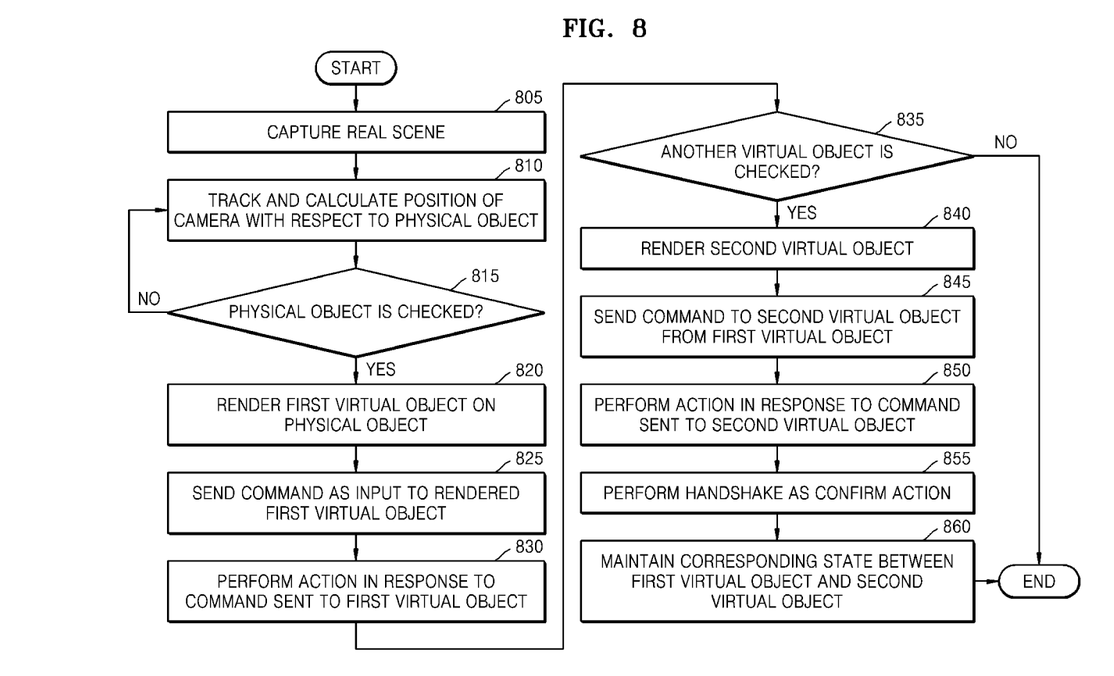
FIG. 8 is a flowchart illustrating an operation method between a first virtual object and a second virtual object according to an embodiment of the present disclosure.

FIG. 8 is a flowchart illustrating an operation method between a first virtual object and a second virtual object according to an embodiment of the present disclosure.

Referring to FIG. 8, in operation 805, the camera device captures a real scene. In some implementation example, a special device may be used to capture the real scene. The real scene is a real environment perceived by human eyes, and includes at least one physical object.

In operation 810, a camera position with respect to a physical object is tracked and calculated. Information obtained during tracking may be used for further requirement.

In operation 815, the physical object in the real scene is checked, and if the checked physical object exists, operation 820 is performed. If the checked physical object does not exist, operation 810 is performed.

In operation 820, a first virtual object is rendered on the physical object. A computing device such as a computer generates the first virtual object and integrates the first virtual object with the physical object. As a result, a markerless AR environment is displayed to the user.

In operation 825, a command is sent as an input to the rendered first virtual object. The command is sent by the user and acts like a trigger with respect to the first virtual object.

In operation 830, an action is performed in response to the input sent from the first virtual object. The command (trigger) performs the action on the first virtual object. For example, the action may be "move up" or "move down", and this action is totally based on an application implemented in the markerless AR environment.

In operation 835, if another virtual object exists, operation 840 is performed. The user selects to dispose many virtual objects on the real scene. Unless another virtual object exists, the operation method is terminated.

In operation 840, if the user desires to dispose a second virtual object, the second virtual object is rendered on the physical object.

In operation 845, a command is sent from the first virtual object to the second virtual object. As a result, communication is established between the first virtual object and the second virtual object.

In operation 850, the second virtual object performs an action in response to the command. By performing the action, the first virtual object may control the second virtual object. The action may be defined as any form of movement.

In operation 855, a handshake is performed as confirmation of the performed action. The handshake is communication between the first virtual object and the second virtual object to confirm that the action is successfully performed.

In operation 860, a corresponding state between the first virtual object and the second virtual object is maintained. During communication between the first virtual object and the second virtual object, the corresponding state is stored in a database.

Figure 9A:
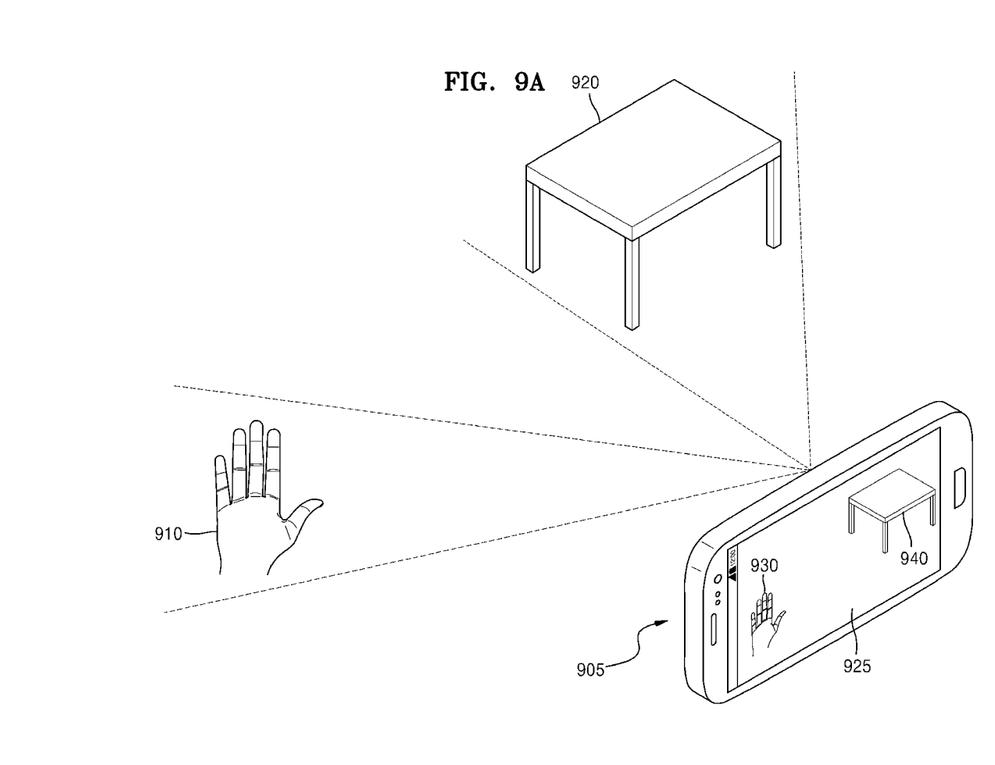
FIGS. 9A, 9B, and 9C illustrate a display of a gun and a ball according to an embodiment of the present disclosure.
Figure 9B:
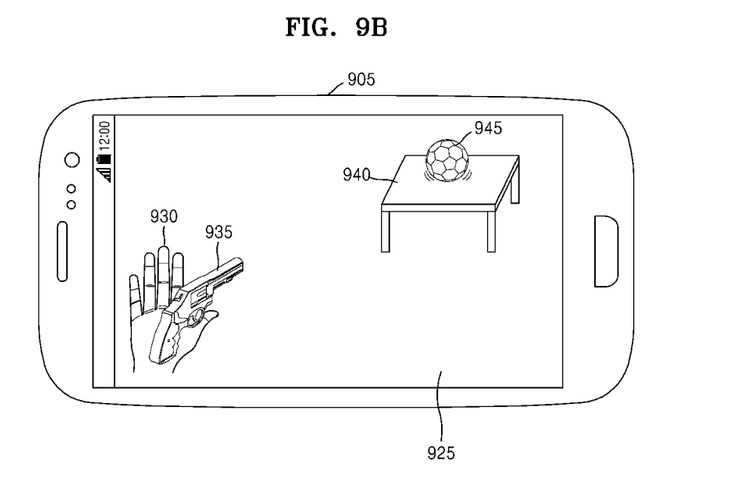
Figure 9C:
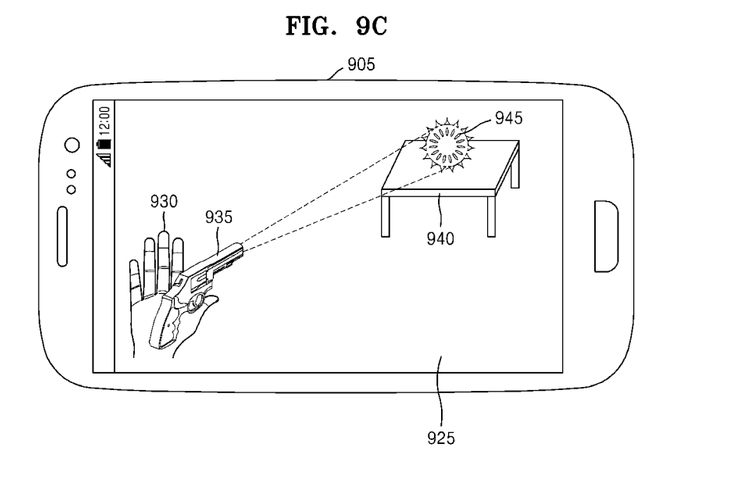

FIGS. 9A to 9C illustrate a display of a gun and a ball according to an embodiment of the present disclosure.

Referring to FIG. 9A, suppose that a smartphone 905 having a video camera device captures a real scene for a user. Multiple physical objects are tracked on the real scene. For example, a physical hand 910 and a physical table 920 are tracked a hand 930 and table 940 on display 925.

FIG. 9B illustrates initial position setting of two virtual objects rendered on a real scene.

Referring to FIG. 9B, a first virtual object, a gun 935 is rendered in a position associated with a first physical object, the hand 930 on the display 925 of the smartphone 905, and a second virtual object, a ball 945 is rendered in a position associated with a second physical object, the table 940. The first virtual object, the virtual gun 935 is rendered on the first physical object 930 to cause the user to recognize that the hand actually holds the gun. Likewise, the second virtual object, the virtual ball 945 is rendered on the physical table 940 to cause the user to recognize that the ball is put on the table.

FIG. 9C illustrates communication established between two rendered virtual objects. The command is sent from the user to the virtual gun 935. The command operates as a trigger with respect to the virtual gun 935, and moves the virtual gun 935 up or down. As a result, the virtual gun 935 is disposed at a correct position and focuses the virtual ball 945. In this state, command-based communication is initiated between the virtual gun 935 and the virtual ball 945. The virtual gun 935 controls the virtual ball 945 to explode through the command.

Figure 10:
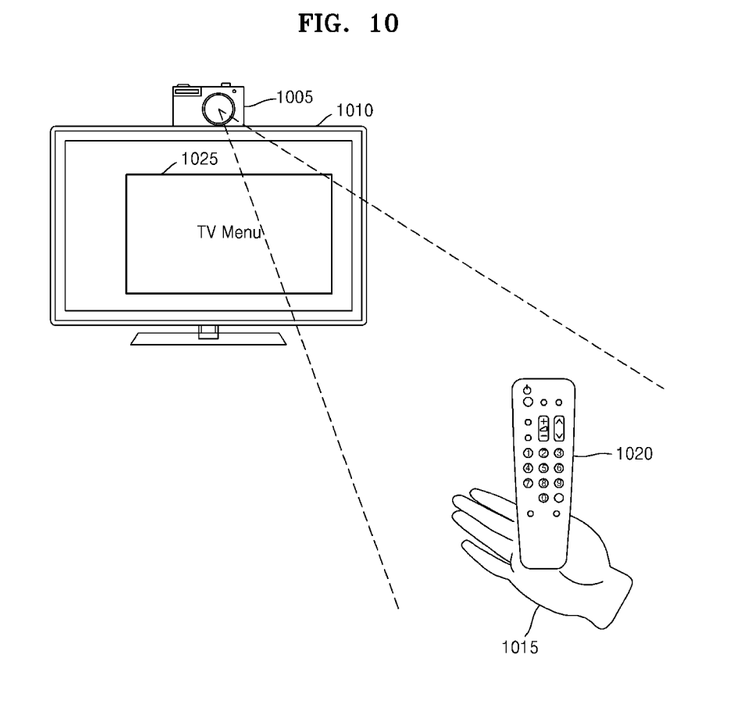
FIG. 10 illustrates a display of a television menu according to another embodiment of the present disclosure.

FIG. 10 illustrates a display of a TV menu according to another embodiment of the present disclosure.

A camera 1005 is attached to a TV 1010. In some various embodiments, the camera 1005 may be an embedded device positioned in the TV 1010.

The camera 1005 captures a user (real scene), and calculates a rendering region of a user hand 1015. Thereafter, a virtual remote controller (first virtual object) 1020 is rendered on the rendered hand region 1015. Similarly, a virtual TV menu (second virtual object) 1025 is displayed on the TV 1010.

Once the user presses the virtual remote controller 1020, corresponding touch motion is received as a touch event. The event may also be called a command. The touch event on the virtual remote controller 1020 is given as an input to the virtual TV menu 1025, and thus initiates communication. A subsequent input from the virtual remote controller 1020 controls the TV menu 1025.

As the event touches the virtual remote controller 1020, a corresponding intensity is calculated and the virtual TV menu 1025 reacts based on the calculated intensity. For example, this reaction may be increasing a real TV volume. A state between the two virtual objects, the virtual remote controller 1020 and the virtual TV menu 1025 is maintained for communication.

Figure 11:
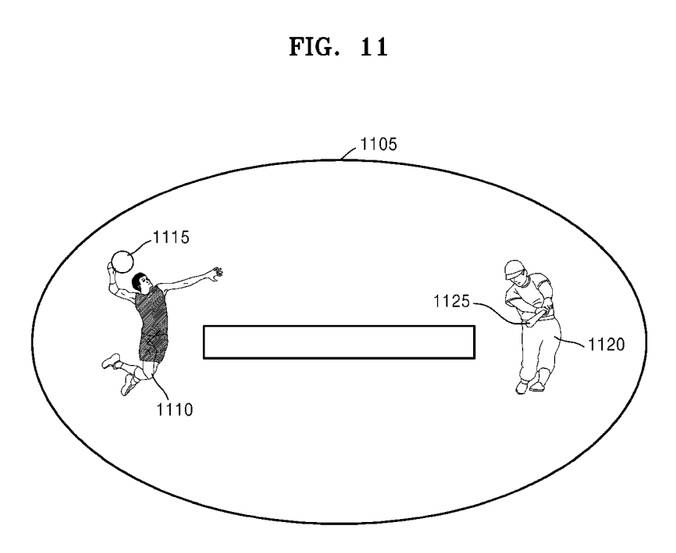
FIG. 11 illustrates a display of a cricket game according to still another embodiment of the present disclosure.

FIG. 11 illustrates a display of a cricket game according to still another embodiment of the present disclosure.

Referring to FIG. 11, illustrates a cricket game in which a camera captures a playground as well as a real cricket pitcher 1110 as a real scene. The real cricket pitcher 1110 holds a virtual ball 1115 by hand.

A virtual pitcher (virtual object 1) 1120 that holds a virtual bat 1125 is rendered on the real scene. A boundary of the captured playground is generated as a virtual wall (virtual object 2) 1105 and rendered on the real scene.

A command is sent to the virtual ball 1115 to move the virtual ball 1115 toward a virtual batter 1120. The virtual batter 1120, upon seeing the approaching virtual ball 1115, hits the virtual ball 1115. Based on a force by which the virtual batter 1120 hits the virtual ball 1115, the virtual ball 1115 moves toward the virtual wall 1105. Once the virtual ball 1115 touches the virtual wall 1105, communication between the virtual ball 1115 and the virtual wall 1105 is initiated. The virtual ball 1115 sends a communication command to the virtual wall 1105.

A game logic interprets the communication command based on an intensity at which the virtual ball 1115 touches the virtual wall 1105. An intensity of the virtual ball 1115 that touches the virtual wall 1105 is also calculated. A corresponding action is performed on the virtual wall 1105. This action is in the form of the signal "4" or "6". The signal "4" is sent if the ball rolls and touches the virtual wall. Likewise, the signal "6" is sent if the virtual ball 1115 directly hits the virtual wall 1105. At the same time, the virtual wall 1105 changes its state from a normal state into a signal state ("4" or "6"). Both signals may be displayed as two different graphic rendering outputs.

The markerless AR framework according to an embodiment specified herein may establish a communication bridge between rendered virtual objects. As a result, communication gives life to the virtual objects in the virtual world by allowing the virtual objects to control each other. The proposed disclosure may be useful for various applications such as a game environment (for example, a chess game or a snakes and ladders game) and further TVs. Similarly, for a TV, remote control, TV volume control, menu control, and channel control may be achieved by the proposed disclosure.

The present disclosure may be embodied as a computer-readable code on a computer-readable recording medium. The computer-readable recording medium includes all kinds of recording devices storing data that is readable by a computer system. Examples of the computer-readable recording medium include ROM, RAM, CD-ROMs, magnetic tapes, floppy disks, optical data storage devices, and so forth. The computer readable recording medium can also be distributed over network coupled computer systems so that the computer readable code is stored and executed in a distributed fashion.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of providing Augmented Reality (AR) on a computing device, the method comprising:
    detecting a first physical object and a second physical object from a real scene obtained through a camera of the computing device;
    displaying the first physical object and the second physical object on a display;
    rendering a first virtual object, at a position with regard to the displayed first physical object, and a second virtual object, at a position with regard to the displayed second physical object, on the real scene provided on the display;
    in response to a first command to the first virtual object, triggering the first virtual object to perform a first action corresponding to the first command, the first command being a first type of command acting on a virtual object;
    in response to the first action, initiating a second command which is communicated from the first virtual object to the second virtual object, the second command being a second type of command which is used in communication between virtual objects; and
    in response to receiving the second command, triggering the second virtual object to perform a second action corresponding to the second command.

2. The method of claim 1, further comprising sending the first command as an input to the at least one of the first virtual object or the second virtual object.

3. The method of claim 1, wherein the triggering of the second virtual object to perform the second action comprises:
    processing the second command; and
    enabling the second virtual object to perform the second action in response to the second command being received by the second virtual object.

4. The method of claim 1, further comprising:
    initiating a handshake, to confirm performing of the first action or the second action, between the first virtual object and the second virtual object; and
    storing states corresponding to the first virtual object and the second virtual object during communication between the first virtual object and the second virtual object.

5. The method of claim 1, wherein the first action or the second action comprises at least one of a touch, a grab, a movement, or a release.

6. The method of claim 1, wherein the first action or the second action is performed based on detection of particular events.

7. The method of claim 6, wherein the particular events are values corresponding to at least one of a state of the first virtual object, a state of the second virtual object, a surrounding environment of the first virtual object, a surrounding environment of the second virtual object, or relative motion between the first virtual object and the second virtual object.

8. The method of claim 1, further comprising providing multimedia effects to the first virtual object or the second virtual object or providing real-time effects to the first action performed by the first virtual object or the second action performed by the second virtual object, during communication between the first virtual object and the second virtual object.

9. A computing device configured to provide Augmented Reality (AR), the computing device comprising:
    at least one processor; and
    a memory communicatively coupled to the at least one processor,
    wherein the at least one processor is configured to:
        detect a first physical object and a second physical object from a real scene obtained through a camera,
        display the first physical object and the second physical object on a display,
        render the first virtual object, at a position with regard to the displayed first physical object, and a second virtual object, at a position with regard to the displayed second physical object, on the real scene provided on the display,
        in response to a first command to the first virtual object, trigger the first virtual object to perform a first action corresponding to the first command, the first command being a first type of command acting on a virtual object,
        in response to the first action, initiate a second command which is communicated from the first virtual object to the second virtual object, the second command being a second type of command which is used in communication between virtual objects, and in response to receiving the second command, trigger the second virtual object to perform a second action corresponding to the second command.

10. The computing device of claim 9, wherein the at least one processor is further configured to send the first command as an input to at least one of the first virtual object or the second virtual object to communicate the second command.

11. The computing device of claim 9, wherein, to render the at least one of the first virtual object or the second virtual object to perform the first action or the second action, the at least one processor is further configured to process the second command sent from the first virtual object to the second virtual object and enable the second virtual object to perform the second action in response to the second command being received by the second virtual object.

12. The computing device of claim 9,
wherein the at least one processor is further configured to initiate a handshake, to confirm performing of the first action or the second action, between the first virtual object and the second virtual object, and
wherein the memory is configured to store states corresponding to the first virtual object and the second virtual object during communication between the first virtual object and the second virtual object.

13. The computing device of claim 9, wherein the first action or the second action is performed based on detection of particular events.

14. The computing device of claim 13, wherein the particular events are values corresponding to at least one of a state of the first virtual object or the second virtual object, a surrounding environment of the first virtual object or the second virtual object, or relative motion between the first virtual object and the second virtual object.

15. The computing device of claim 9, wherein the memory stores a database which is connected to the at least one processor and is configured to store information about handshakes between the first virtual object and the second virtual object and information about the first virtual object and the second virtual object.

16. The computing device of claim 9, wherein the at least one processor is further configured to provide multimedia effects to the first virtual object or the second virtual object or to provide real-time effects to the first action performed by the first virtual object or the second action performed by the second virtual object, during communication between the first virtual object and the second virtual object.

17. A non-transitory computer-readable recording medium having recorded thereon a program for executing a method of providing Augmented Reality (AR) on a computing device, the method comprising:
detecting a first physical object and a second physical object from a real scene obtained through a camera of the computing device;
displaying the first physical object and the second physical object on a display;
rendering a first virtual object, at a position with regard to the displayed first physical object, and a second virtual object, at a position with regard to the displayed second physical object, on the real scene provided on the display;
in response to a first command to the first virtual object, triggering the first virtual object to perform a first action corresponding to the first command, the first command being a first type of command acting on a virtual object;
in response to the first action, initiating a second command which is communicated from the first virtual object to the second virtual object, the second command being a second type of command which is used in communication between virtual objects; and
in response to receiving the second command, triggering the second virtual object to perform a second action corresponding to the second command.

18. The non-transitory computer-readable recording medium of claim 17, wherein the communicating of the the second command is automatically performed without user interaction with the computing device.

* * * * *